Figure 1:
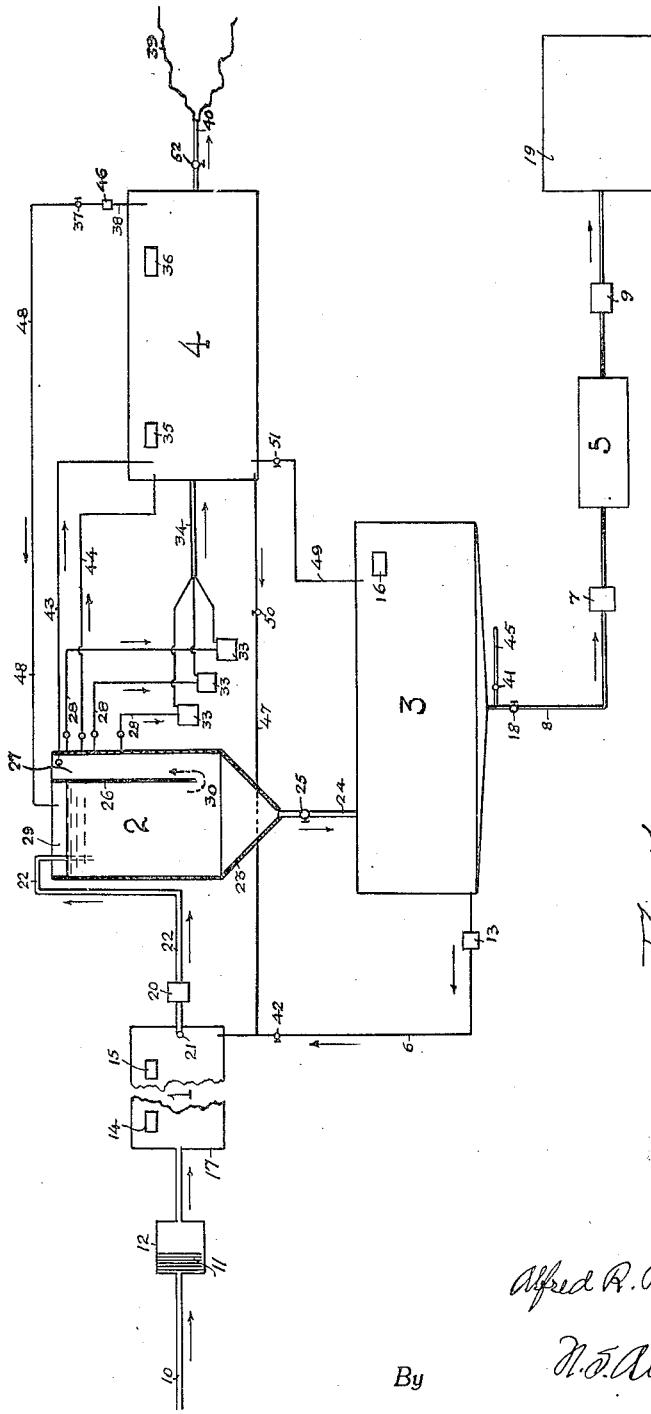

June 20, 1933.  A. R. PUTNAM  1,915,240
SEWAGE PURIFICATION
Filed Nov. 28, 1932  2 Sheets-Sheet 1

Alfred R. Putnam Inventor

By  Attorney

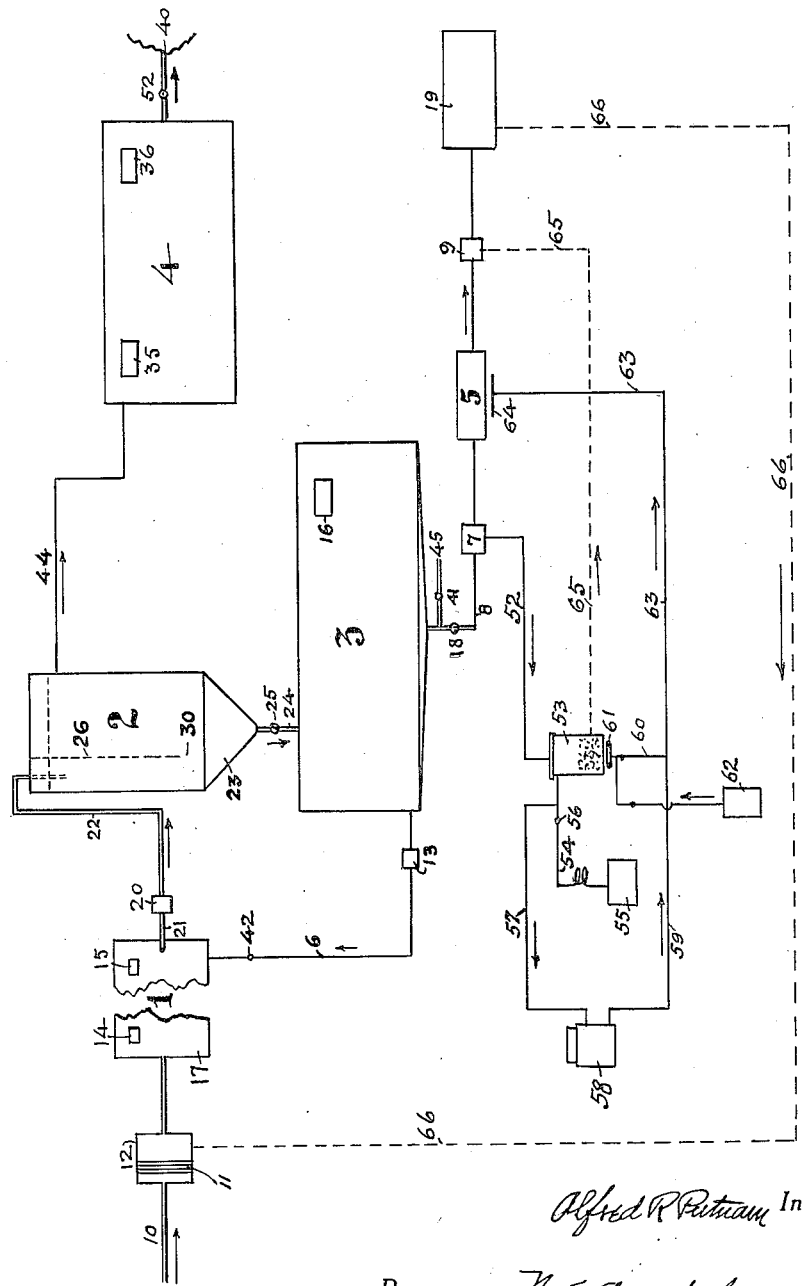

Patented June 20, 1933

1,915,240

UNITED STATES PATENT OFFICE

ALFRED R. PUTNAM, OF VALPARAISO, INDIANA

SEWAGE PURIFICATION

Application filed November 28, 1932. Serial No. 644,631.

My invention relates to improvements both in plant and process in sewage purification and it more especially consists of the features pointed out in the claims.

The purpose of my system of purification is to provide cooperating means and steps which will completely purify sewage without dependence on or the intervention of conventional bacterial or biological treatment; that accomplishes this through and by the following steps:—

(a) Certain chemicals and substances are added to and mixed with the incoming raw sewage, the chemical and mechanical reaction of which deodorizes it and produces an insoluble, heavy, gelatinous substance, called floc.

(b) After the floc is formed and farther along in the flow, an oxidizing and sterilizing agent is added to the chemically treated sewage, whereby all bacteria and disease germs as well as small colloidal particles are destroyed. Steps (a) and (b) destroy all odor, bacteria and disease germs, and supply oxygen to the sewage and prepare it for coagulation or a rapid separation of the solids from the liquid and prepare the solids for carbonization or any other heat treatment.

(c) The floc formed under step (a) will settle through the liquid where it collects and enmeshes the solids so that rapid precipitation or sedimentation of the solids is accomplished.

(d) The precipitant or sediment is drawn off, dewatered, dried and prepared for commercial disposal or other use.

(e) The liquid above the precipitant, void of solids, is drawn off and receives a secondary treatment of sterilization and oxidation.

That employs the above steps without interrupting the continuous flow of the sewage to and through the plant and which subjects the entire flow in sequence to chemical action, deodorization, oxidation, flocculation and sterilization in cooperation with gravitational sedimentation thus producing a clear and harmless effluent and a sludge by-product. These results are obtained with a relative small equipment on a basis of economic and efficient treatment hitherto unattainable.

This application is a continuation in part of my copending application Serial Number 349,617, filed March 25, 1929.

With these and other ends in view I illustrate on the accompanying diagrammatic drawings such instances of adaptation as will disclose the broad underlying features of my invention without limiting myself to the specific cooperating steps shown thereon and described herein.

The drawing Figure 1 shows an assembly of an entire plant, illustrating the parts in diagrammatic relation to each other.

Figure 2 is a diagrammatic view of my system in which a portion of carbonized sludge is returned to the raw sewage.

In commercializing my system, I may use whatever equivalents and alternatives of structure that the exigencies of varying conditions may demand without departing from the broad spirit of the invention.

For the purpose of more direct comparison with the parent application similar numerals have been used but the instant disclosure being one in diagrammatic form certain numerals of the original application are necessarily omitted.

In brief, the entire flow of raw sewage enters the plant through a chemical mixing chamber 1 and it successively and continuously passes through a coagulating tank 2 from which the settled sludge is drawn off into a tank 3 and the liquid from the tank 2 passes to a secondary or final treatment tank 4 thus completing the traverse of the sewage through the plant and delivering an innocuous effluent, which will not pollute a body of water into which it passes.

The entire volume of raw sewage enters the plant at 10. It passes through any desired form of screen 11 placed between the entrance and exit of casing 12. This prevents rubbish, clothes, etc., from entering the purification system which, as stated, includes the main parts 1, 2, 3 and 4. The screened sewage passes into a relatively long mixing chamber 1 which is enclosed by walls 17. Separate chemical feed openings 14 and 15 are provided in the top or cover of this chamber. The chemicals such as lime and ferric chloride introduced here are thoroughly mixed with the sewage by the activity of its flow. They kill the bacteria, oxidize and deodorize the treated mass and produce a flocculent condition of the liquid and solids ready for delivery into the coagulating tank 2.

One or more pumps 20 are placed between the line 21 and the line 22. These transfer the entire flow of sewage from the mixing chamber or tank 1 into the tank 2, delivering it near the top. This tank has a vertical baffle wall 26 which divides the tank into a compartment 27 at the right of the wall, a second compartment 29 at the left of the wall, and a sedimentation compartment 30 within the conical bottom 23 and below the lower edge of the baffle 26. The capacity of this tank and each compartment thereof is sufficient to insure that the flow of the liquid downward in compartments 29, 30 is nearly quiescent so that the gradually enlarging flocculated particles become heavy enough to drop into the conical bottom 23 and the liquid freed from such particles passes undisturbed beneath the baffle 26 and quietly rises in the compartment 27, where at different elevations outlets 28 lead to separate centrifuges 33 or it may be transmitted directly to tank 4 through a by pass 44 for further treatment. Each outlet 28 may be provided with a valve 31.

In the lower portion of the chamber 27 further sedimentation takes place as the liquid rises, in fact a layer of flocculated particles in this chamber serve as a natural filter which is self renewing. As the particles increase in size the larger ones drop down by gravity continuously so that the effluent, passing out through the pipes 28 placed at different elevations to compensate for changes in volume of flow or directly to tank 4 through pipe 44, is practically freed from all the coarsest particles. Whatever solids are left are removed by the centrifuges 33 and the effluent from these machines is delivered through a line 34 common to as many of the machines as may be used, to the secondary treatment tank 4 for further oxidation and sterilization. If the effluent from tank 2 is passed directly to tank 4 through pipe 44 the remaining solids will be oxidized and floated off as scum from the sterilized liquid in any desired manner.

The bacterial free sediment or sludge which accumulates in the compartment 30 is drawn off through the pipe 24 and valve 25 into the sludge tank 3, where, if wanted, additional chemical treatment may be applied through feed 16. If desired any accumulating free liquid or sludge in tank 3 may be carried through a return line 6 to the mixing chamber 1. When the tank 3 is placed higher than the bottom of tank 1 the flow to the latter may take place by gravity.

When needed, a draw-off pipe 45 with a shut-off valve 41 may be attached to the bottom of tank 3. The accumulated sludge in tank 3 is removed through a valve 18 in the pipe 8 to a centrifuge or other dewatering device 7 and from there to a sludge drier 5 and thence to a grinder 9 and final delivery to a storage bin 19 for commercial disposition as a fertilizer or the dried sludge may be burned as fuel for the drier. In order that the solid content of the sewage may be held uniform and to completely use up all the chemical and in addition assist in clarifying the raw sewage, a portion of the solids (called sludge) in tank 3, previously removed from the sewage, is returned from the sludge tank and added to the raw sewage in the mixing chamber 1. This materially reduces the amount of chemicals required in the treatment.

The sludge which is 98% water is drawn from tank 2 and delivered to tank 3 where it receives further treatment with iron chloride and an oxygen liberator. The iron chloride, acting as an acid, tends to separate the solids from the liquid just as cold water acts in gathering butter after churning. The liberated oxygen oxidizes and reduces the specific gravity of the solids causing them to rise just as cream rises to the top of milk. The clear water left in the bottom of tank 3 is withdrawn through pipe 45 and the solids are then dewatered, and ground. The solids thus ground are odorless, non-putressive and ready for commercial use as fertilizer or, as stated, they can be returned to the furnace of the drier and incinerated as occasion demands.

The liquid coming from the centrifuges 33 passes through pipe 34 into the secondary treatment tank 4 where, through chemical feeds 35 and 36, oxidizing and sterilizing chemicals such as ozone, nacent oxygen or chlorine or their equivalents are added. If found desirable a pipe 38 may lead from the bottom of this tank through a pump 46, valve 37 and pipe 48, to compartment 29 of the coagulating tank 2. Should there be any additional sedimentation in the bottom of tank 4 it is returned to tank 2 for further processing through its compartments, or it may be returned direct to the mixing chamber 1 through valve 50 and pipe 47; or it may be passed through valve 51 and pipe 49 to the tank 3. A valve 52 is placed in the outlet 40 from the tank 4, where the harmless effluent passes into the stream or other body of water 39. A valve 41 may also be placed in the outlet 45 from the tank 3, and as a precaution an overflow line 43 may connect the top of tank 2 with tank 4.

With these and other cooperating features, I am able to make ample provision for the continuous purification treatment of any volume of sewage in a plant approximately one-tenth the size now in use, in marked contrast to the large area required when activated sludge or plain sedimentation, filter, sludge digestion methods are used, including the large cost of filter bed maintenance, without realizing an actual innocuous effluent.

My system comprises a continuous flow of all the sewage; a continuous chemical treatment and oxidation and deodorization; a continuous, quietly moving coagulation; continuous segregation and precipitation of the solids without agitating the flow; continuous filtration of the solids from the flow; continuous selection of the solid free liquid to centrifugal action or oxidation and sterilization; an intermittent treatment of the bacteria free sludge by dewatering, drying and grinding; a continuous oxidation and sterilization of the effluent; the return of any last precipitants in the secondary treatment tank to recoagulation, etc.; and the return of liquids or sludge or products of the sludge from the sludge tank to be remixed with the incoming sewage.

Applicant attains results which have not been secured heretofore by reason of first using chemicals such as milk of lime, iron sulphate, iron chloride, and any oxidizing agent, in the mixing chamber to kill the bacteria, deodorize and produce flocculation; then, without agitation, coagulating the flocculated particles to separate the solids from the liquid while the flow is kept in a steadily moving and undisturbed state; then by further oxidizing the segregated liquid and sterilizing it to make the effluent harmless; and also separately caring for the deposited sludge so as to make it available as a fertilizer as a fuel or a carbon compound. The solids which accumulate in the centrifuges 33 may be removed by any desired means (not shown), dried and stored similar to the use of centrifuge 7 or other dewaterer, drier 5 and grinder 9.

The chemicals used in the tank 1 to deodorize, kill the bacteria and produce a heavy floc may be milk of lime, iron sulphate, iron chloride, and any oxidizing, and sterilizing agent. The mixing of milk of lime with the sewage destroys the odor—hence it is the first chemical used, as 14, in order that the odor may be destroyed before the lime undergoes the chemical action produced when it comes in contact with the iron sulphate, at 15. If the iron sulphate were added first, there would be less deodorization because the iron would attack the lime immediately on its arrival and the deodorizing properties of the lime would be reduced. Sulphate of iron and chloride of iron produce a quick chemical action and a heavy insoluble floc. The lime at 14 plus the iron chloride at 15 act as a germicide and they destroy most, if not all, the bacteria and prepare the solids for subsequent carbonization to a carbon compound or for use as fuel.

The chemicals used in the sludge tank 3 may be iron chloride and any oxidizing agent, and the sterilizing chemicals in tank 4 may be chlorine or any oxidizing agent all in amounts sufficient to produce the destruction of the bacteria, and secure deodorization, oxidation and sterilization of the effluent. The exact quantities are variable to meet the composition of the incoming sewage which may vary from day to day in the same plant and in different cities.

I have heretofore described a step in my system which includes the introducing of a portion of the wet sludge from tank 3 into the incoming sewage in chamber 17 through pipe 6 and the advantage of doing this. I have also described another step which includes the dewaterer 7 to handle any excess sludge and then passing it to a dryer 5 and a grinder 9 and into a storage chamber 19 for subsequent use as a fertilizer. The dried sludge which has been ground may be, as stated, incinerated or it may be used, when burned under forced draft, to supply heat for the drier. This use is similar to that when powdered coal is employed for heat producing purposes.

In the treatment and handling of the sludge residue from various sources such for instance as an anti-bacterial and chemically treated sewage etc. I have discovered that instead of dewatering, drying and grinding the sludge for fertilizing or heat producing purposes it is advantageously used by putting it through a retort 53, over pipe 52, directly from the dewaterer 7 so as to char or carbonize the particles. The material so produced is a very fine grade of activated carbon compound. It is powdered sufficiently fine or finer to pass through a 200 mesh screen. It cooperates admirably with the other features of my system when it is introduced into the raw sewage in advance of subsequent chemical treatment due to its absorbing the gases and putrescible matter which are in solution and because of the iron oxide in the carbon compound its particles are weighted. This increases the speed at which the solids are settled from the liquid.

By adding the minute activated carbon particles to the raw sewage at 12 all gases putrescible and coloring matter etc. are absorbed by the carbon and the carbon particles act as a nucleus around which coagulation will take place. This coaction prepares all suspended solids and the majority of such solids as are found in solution for precipitation with the sludge. The carbon particles freed from impurities have an affinity for impurities in the raw sewage which assists in coagulating and settling out the solids by gravity. These solids also include the enmeshed carbon particles which are reclaimed by means of the charring action after the sludge has been dewatered. This reduces the quantity of chemicals needed to operate the system.

The sludge from the dewaterer 7 is taken to the retort 53 and subjected to a temperature sufficiently high to drive off all moisture and gases and char the residue which is afterward passed through the grinder 9 to reduce the carbon masses removed from the retort 53 into an impalpable powder. The steam generated in the retort 53 during the process of drying is led through pipe 54 to condenser 55 in any well known manner. And it may be subjected to further distillation as desired to reclaim alcohol, acetone or any other constituents which may be found in the liquor.

The gases coming from the retort after the moisture has been removed or emitted from the sludge during the process of charring is passed through a pipe 57 to a gas holder 58. A valve 56 is used to shut off the condensing system. This gas may be used for drying the sludge in chamber 5 by means of a burner 64 when it is treated for producing a fertilizing agent or it may supplement any other source of heat 62 available for heating the retort 53 by a burner 61 or it may be utilized for any desired purpose. When the activated carbon particles are added to the raw sewage at 12 the work of the centrifuges 33 and the tank 4 is largely reduced, in fact all the effluent from tank 2 may be passed through pipe 44, as heretofore stated to the tank 4 for sterilization as desired. The final effluent from tank 4 will be harmless and without odors.

The carbon constituents of plant growths after being ingested are activated to a marvelous degree which transcends any activation to which artificial carbon is ordinarily subjected, hence the end product of my system of sewage purification contains ingredients of unknown potency, available as an accelerator in sewage treatment and for industrial and scientific uses hitherto unknown.

The introduction of the carbon particles into the raw sewage removes the putrescible matter and the other impurities from solution and hastens the production of the floc and the gravitational sedimentation and thus shortens the entire time required to purify raw sewage into an innocuous effluent.

The reduction of sewage sludge into an activated absorbent and absorbent carbon is of commanding importance and it is claimed in its broadest sense, because it is the end product of innumerable related chemical changes through the entire cycle of soil production, ingestion, and egestion associated with such chemicals as may be used in the purification steps to which the raw sewage is subjected.

The gas stored in the gasometer 58 is led through pipe 59 and 60 to the retort burner 61 and pipe 63 to the dryer burner 64. Carbon from the retort is taken over the traverse 65, shown in dotted lines, to the grinder 9 and the pulverized finely divided carbon particles are returned in any desired manner over traverse 66 to the raw sewage at 12 or any point in advance of the chemical mixing chamber 1.

The production and use of the activated carbon is further described as follows:—

The compound of finely powdered activated carbon, ferric oxide and associated non-soluble substances is added to the incoming raw sewage at 12 in amounts depending upon the physical condition and character of the sewage, approximately 3 grains of the carbon per gallon and the ferric oxide and other non-soluble substances in an amount approximating .5 grains per gallon. As the flow of sewage varies from moment to moment, the quantity of carbon, ferric oxide, etc. will also vary, either up or down, as the flow varies.

The purpose of the finely powdered activated carbon is to accelerate sewage purification. It is a known fact that the putrescible matter in sewage exists both in solution and in suspension and that the gases likewise exist both in solution and in the solids which are held in suspension. When the carbon compound is added to the incoming raw sewage it immediately absorbs the gases and putrescible matter which are held in solution.

From the peculiar and unusual source of origin of the activated carbon, it having once been a part of the solids of the chemically treated sewage, and its porous characteristics, it has a special affinity for impurities, such as it gave up in the final treatment of the dewatered sludge during the charring process. It eagerly absorbs and loads itself with existing impurities while in contact with the raw sewage. These impurities are absorbed and adsorbed and firmly held by the carbon particles somewhat analogous to the way in which water or other liquids are held by a sponge. The finely powdered bits of carbon loaded with the impurities and scattered throughout the bulk of sewage form the nucleii for the solids which are thus collected during coagulation.

The use of the ferric oxide and associated insoluble substances in conjunction with the carbon is for the purpose of adding weight to the carbon so that upon coagulation, rapid precipitation follows; therefore by the addition of the activated carbon compounded with ferric oxide and associated insoluble substances, the impurities of the sewage which are held in solution are extracted by the carbon including the odors that otherwise would escape, as well as the putrescible matter that was in solution, also the ammonia and its compounds are all firmly held by the carbon. The carbon with its load of impurities extracted from the sewage together with other solids in suspension is caught by ferric hydroxide during coagulation and it is precipitated as sludge, thus deodorizing the sewage.

The flow of sewage as already stated is variable in quantity and quality. In no two consecutive seconds of the flow is its content the same. Notwithstanding this variation of quality I have found by experience that if the solid contents of the sewage are arbitrarily brought to a point to a similar quality or slightly greater than that contained in the maximum flow of the raw sewage the addition of the various substances used in the treatment is very simple as well as a nearly uniform procedure. The matter of creating an approximately uniform solid content in the sewage is accomplished by adding a small portion of the chemically treated settleable sludge taken from the sludge tank 3 to the raw sewage, in advance of which the activated carbon has already been added. As the added carbon is inert and its function is purely mechanical I have found it best to introduce an excess of carbon above that actually needed to be sure that the impurities are adsorbed and absorbed. An excess of carbon does no harm, as it is reclaimed in the retort 53 and its aid in dewatering the sludge at 7 is cooperatively valuable, in fact it is quite important because it gives a desirable texture to the sludge.

After the sewage has been treated as hereinbefore set forth and to forestall any further decomposition by the putrescible matter that exists in the sewage in suspension a solution of hydrate of lime and water is added in tank 1 and thoroughly mixed with the sewage, the amount of lime varying according to the character of the sewage, generally about 3 grains per gallon or in any event enough to bring the pH of the solution to a point approximately 7.6 to 7.8. To the sewage as heretofore treated by the addition of the carbon compound, ferric oxide, sludge from previously treated sewage and hydrated lime I add a solution of ferric chloride generally an amount approximating 1.2 grains per gallon or in any event enough to reduce the pH of the solution to a point approximating 7.0 to 7.2. Immediately after the ferric chloride is added and mixed with the sewage in tank 1 a chemical reaction occurs between the lime and iron, resulting in the formation of ferric hydroxide which is insoluble and calcium chloride which passes into solution. The ferric hydroxide forms the coagulant and immediately collects and wraps up the solid contents of the sewage including the carbon particles which are loaded with impurities taken from the solution including the ferric oxide and associated insoluble substances. At this stage of the process the preparation of the liquid and solids for separation and coagulation has been completed and the whole mass is now transferred from the mixing chamber 1 to the coagulation tank 2.

The presence of the ferric hydroxide and associated insoluble substances in tank 2 adds weight to the coagulated particles and rapid precipitation occurs. It is through this rapid precipitation that the size of the coagulating tank as well as the size of the whole plant is reduced to a minimum. The precipitated mass in the bottom of the coagulation tank is drawn from the bottom of said tank as sludge and transeferred to the sludge tank 3 and the clarified liquid overflows at the top of the coagulation tank 2 passing to tank 4 where it may receive further sterilization by the addition of chlorine or any other cooperating chemicals such for instance as potassium permanganate or sodium peroxide, after which the effluent passes through the overflow of tank 4 as an innocuous effluent.

The compound of activated carbon, ferric oxide and associated insoluble substances is obtained by dewatering the sludge drawn from tanks 2 and 3, by placing it in a retort 53 where sufficient heat is applied to drive off all its moisture content as steam, condensing and collecting it as well as the gases at 55. The ammonia thus driven off is passed into water for recovery while the insoluble gases are collected in a gas holder 58 to be used as fuel. The charred remains of the sludge is removed from the retort and powdered. The ferric hydroxide contained in the sludge is converted by heat in the retort into ferric oxide, thus forming a mixture of carbon, ferric oxide and associated non-soluble substances present in the sewage and contained in the sludge.

I have discovered that the use of this carbon compound actually obtains results in the removal of gases and other impurities from solution and hastens coagulation and precipitation of sewage better than any other agent heretofore known. It is a compound of its kind and seems to have a particular affinity for impurities existing from whence it came and it eagerly absorbs these impurities at the first opportunity.

It is to be noted that my system and process of chemically treating sewage to secure a sludge by-product from which I produce a unique carbon compound is a process that is radically different from other systems of sewage treatment.

What I claim is:

1. In sewage purification, a chemical mixing chamber, a vertical coagulating tank, a conical bottom to such tank, a vertical baffle separating the tank into two compartments, means for transferring the sewage from the mixing chamber to the coagulating tank on one side of the baffle, means for withdrawing the solids from the conical bottom, means for conducting the liquid from the other side of the baffle to a plurality of centrifuges, a secondary treatment tank, means for conducting the liquid from the centrifuge to said secondary treatment tank, a by-pass from the coagulating tank to the secondary treatment tank, means for adding an oxidizer and sterilizing agent to the latter tank, an overflow between the two tanks, means for returning liquid from the secondary treatment tank to the coagulating tank, a by-pass for returning deposits from the secondary treatment tank to the mixing chamber, and means for removing the sludge from the coagulating tank and passing it through a dewaterer, drier and grinder.

2. The process of chemical sewage purification which consists in introducing into the raw sewage a carbon compound including ferric oxide secured from previously treated sewage sludge, in introducing precipitated sewage sludge into the sewage, in introducing lime into the sewage, in introducing ferric chloride into the sewage, in thoroughly mixing these materials with the sewage as and when introduced, in subjecting such sewage to continuous flocculation and sedimentation without agitation to produce an innocuous effluent and a sludge by-product including carbon and ferric hydroxide, and in transforming the sludge under heat into a finely divided carbon compound including ferric oxide.

3. The process of chemical sewage purification which consists in introducing into the raw sewage a carbon compound including ferric oxide secured from previously treated sewage sludge, in introducing lime into the sewage, in introducing ferric chloride into the sewage, in thoroughly mixing these materials with the sewage as and when introduced, in subjecting such sewage to continuous flocculation and sedimentation without agitation to produce an innocuous effluent and a sludge by-product including carbon and ferric hydroxide, and in transforming the sludge under heat into a finely divided carbon compound including ferric oxide.

4. The process of purifying sewage which consists in introducing into the raw sewage an activated carbon compound including ferric oxide, lime and ferric chloride to separate the solids from the sewage as sludge, in removing moisture from the sludge, in subjecting the remaining sludge to heat to transform the ferric hydroxide into ferric oxide and the solids into carbon, and in condensing the vapors given off by the sludge when it is subjected to heat.

5. In sewage purification, a chemical mixing chamber, a vertical coagulating tank, a conical bottom to such tank, a vertical baffle separating the tank into two compartments, means for transferring the sewage from the mixing chamber to the coagulating tank on one side of the baffle, means for withdrawing the solids from the conical bottom, a secondary treatment tank, means for conducting the liquid from the other side of the baffle to said tank, means for adding an oxidizer and sterilizing agent to the latter tank, an overflow between the two tanks, means for returning liquid from the secondary treatment tank to the coagulating tank, a by-pass for returning deposits from the secondary treatment tank to the mixing chamber, means for receiving the sludge from the coagulating tank and passing it through a dewaterer, and subsequently disposing of the accumulated sludge.

6. The process of chemical sewage purification which consists in subjecting the raw sewage to a continuous lime and iron chloride flocculation and to a carbon compound recovered from the previously treated sludge and mechanical sedimentation to produce an innocuous effluent and floc by-product including ferric hydroxide, in transforming the sludge under heat into a finely comminuted activated carbon compound including ferric oxide, in introducing some of such compound into the raw sewage to hasten and assist the purification, and in reclaiming the added carbon compound including ferric oxide.

7. The process of mechanically removing gases and putrescible substances from raw sewage, which consists in introducing into the sewage a chemically laden carbon compound including ferric oxide secured by subjecting previously separated chemically laden sewage sludge including ferric hydroxide to a charring temperature, and in subjecting the sewage so treated to sedimentation to separate the carbon compound first introduced.

In testimony whereof I affix my signature.
ALFRED R. PUTNAM.